UNITED STATES PATENT OFFICE.

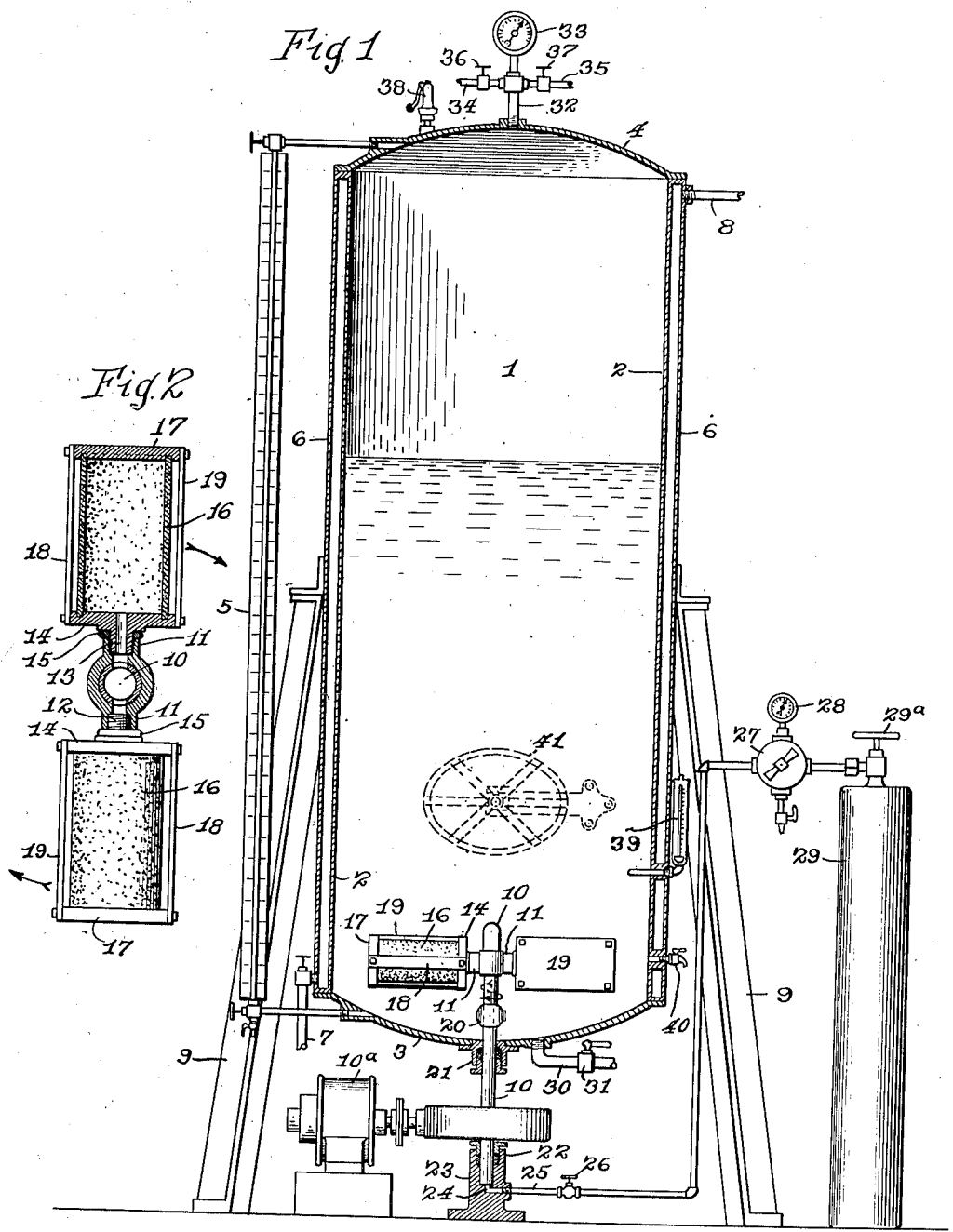

HERMAN HEUSER, OF CHICAGO, ILLINOIS.

APPARATUS FOR MAKING CARBONATED BEVERAGES.

1,308,587. Specification of Letters Patent. Patented July 1, 1919.

Application filed April 5, 1917. Serial No. 159,910.

*To all whom it may concern:*

Be it known that I, HERMAN HEUSER, a citizen of the United States, residing at Chicago, in the county of Cook and State of Illinois, have invented certain new and useful Improvements in Apparatus for Making Carbonated Beverages, of which the following is a specification, reference being had therein to the accompanying drawing.

My invention relates to apparatus for the manufacture of carbonated soft drinks or soda water, and in particular to the dilution or mixing of the flavoring syrups with water, to the carbonation of the mixture and to the drawing-off or dispensing of the beverage.

In the drawings,

Figure 1 is a view partly in side elevation and partly in vertical section showing an apparatus embodying the various features of my invention; and Fig. 2 is a view in longitudinal horizontal section through the combined stirrer and gas distributer.

Referring to the drawings, the reference numeral 1 designates a tank for receiving the measured syrup and water, and in which the mixture is cooled and carbonated and from which the carbonated beverage is drawn or filled-off under pressure, and it consists of a closed shell composed of a vertical cylindrical body 2, dished bottom 3, and dished top 4. The tank is provided with a measuring gage glass 5 to indicate the quantity of syrup and the combined quantity of syrup and uncarbonated water commensurate with the ounce-value of the syrup, the term "ounce-value" being well-known and used in the art of preparing flavored beverages to indicate the ratio of dilution of the flavoring syrup with water for bottling in the standard eight-ounce capacity bottles in which these beverages are usually vended; thus, if the ounce-value of the syrup is 1 it means that one ounce of syrup is diluted with water at the ratio of 1 to 8, and if the ounce value of the syrup is 2, as is frequently the case for ginger ale, it means that the dilution is at the ratio of 2 to 8, the syrups in these examples being known and identified in the trade respectively as one-ounce syrup and a two-ounce syrup. The markings on the gage 5 indicate or measure off the quantity of syrup or extract admitted to the tank and the combined quantity of syrup and water in the tank to dilute the syrup in the beverage according to the ounce-value of the syrup. The tank body 2 is surrounded by a closed cooling jacket 6 having a valved inlet pipe 7 for the cooling medium and an outlet pipe 8. The tank is carried upon suitable feet or supports 9, and it is provided with a stirrer and gas distributer mounted on a hollow shaft 10 provided with hollow arms or lateral extensions 11 having internal threads 12 engaged by corresponding threads on the reduced tubular ends 13 of metallic heads 14, rubber washers 15 being employed to make a gas-tight joint. Each head 14 carries a hollow cylinder or shell 16 of porous material, vegetable or mineral, but preferably of mineral material such as porous silica, for instance infusorial earth or kieselguhr, or porous silicates of alumina such as unglazed earthen ware; they are permeated with innumerable pores or orifices of microscopical minuteness so that the carbonic-acid gas is minutely subdivided to facilitate its combination with the liquid mixture. The shells are carried on the heads in any suitable way, and preferably in a frame composed of a head 14 and an outer head 17 rigidly connected by metal strips 18 on one side and metal plates 19 placed at that side of the shell toward which the stirrer turns when in motion, that is to say to the right side in the present instance as shown by the arrow in Fig. 1. The heads are of greater diameter than the shells so that the parts 18 and 19 of the supporting frames are spaced away from the shells and do not obstruct the passage of the gas therethrough.

The hollow shaft 10 is provided with a non-return check-valve 20 opening by pressure from below and closing by pressure from above to prevent the liquid passing back through the porous shells and the hollow shaft when the evacuating pressure is exerted on it after it is carbonated, and with a stuffing-box 21 at its passage through the tank-bottom 3 and a stuffing-box 22 at its bearing-block 23. The bearing-block is provided with a passage or bore 24 which connects the hollow shaft 10 with a pipe 25 provided with a stop-cock 26 and a pressure-reducing valve 27 and gage 28, and leading to the carbonic-acid cylinder or drum 29 provided with expansion valve 29ª. The shaft is revolved from a suitable motor 10ª.

The tank is provided in its bottom with a pipe 30 having a valve 31 and serving as the inlet for the syrup and water and as the outlet for the carbonated beverage. The tank is provided at its top with a pipe 32 having a pressure-gage 33 and side extensions 34 and 35 having valves 36 and 37 respectively, serving as inlet and outlet for compressed air. The tank also has a safety valve 38, thermometer 39, try-cock 40 and manhole-door 41 swinging on hinges toward the inside of the apparatus.

In using the apparatus, the flavored syrup enters the tank through pipe 30 to the extent of a given quantity, say 25 gallons, measured by the liquid gage glass 5, and a certain quantity of water preferably clarified by filtration is added. In case of a one-ounce syrup requiring a dilution in the ratio of 1 to 8, the volume of the liquid in the tank is raised to 200 gallons measured by gage glass 5. During the operation of charging the tank with the syrup and water the valve 36 is kept open, and the valve of pipe 7 is opened to allow cold brine to enter the jacket 6 in which it circulates upward and back to the source of brine supply through pipe 8. Simultaneously with the brine circulation in the jacket the motor is put in motion, and the stirrer rotates in the direction shown by the arrows in Fig. 2.

The stirrer moves the liquid centrifugally at a rate high enough for a moderate circulation, and the circulation is directed from the stirrer to the walls and upward along the walls into the top strata of the liquid and from there to the center back and again to the stirrer. This circulation conducts all parts of the liquid to and from the cooling jacket and expedites the cooling of the mixture.

When the mixture has been cooled to a low temperature, say 36° F., as indicated by the thermometer, the valve of pipe 7 is closed and valves 27 and 29ª and stop-cock 26 are opened, whereupon the carbonic-acid gas passes into the hollow shaft 10 and through the pores of the shells 16 into the mixture. Proper reduction of the carbonic-acid gas pressure is effected by valve 27 and indicated by gage 28. To save time stirring, cooling and carbonating may take place simultaneously. The shells atomize the carbonic-acid gas through their pores into the mixture, and with the stirrer in motion the circulation of the mixture conducts all parts of it to and from the carbonating surfaces, whereby direct carbonation is extended to the entire mixture. Carbonation is started with a low air pressure in the tank, and as it proceeds the pressure as indicated by gage 33 is increased, and when the mixture has been carbonated to the desired degree, as may be seen from a sample taken at the try-cock 40, the pressure on the gage usually indicates 12 to 15 pounds, and thereupon valves 26 and 29ª are closed, and the motor is shut off, and then the apparatus may be used for drawing off the beverage, as for bottling. It is conducted to the bottling machine by the pipe 30, and it is evacuated from the tank by air pressure by admitting compressed air through pipe 32 upon the surface of the beverage; the height of the pressure depends upon a number of factors, but the most important factor is that it be higher than the pressure under which the mixture is carbonated to prevent decarbonation or the escape of carbonic-acid gas from the surface of the beverage. In practice the evacuating pressure is 16 lbs. indicated by gage 33.

The combined stirrer and gas distributer of porous material effects the introduction of the carbonic-acid gas through pores or orifices of microscopical minuteness into the mixture while the latter is subjected to agitation, and thus accomplishes true atomization of the carbonic-acid gas and its direct action on all parts of the mixture. During the bottling or filling-off, the beverage in the tank works with a pressure upon the filling-machine, and it is important that this pressure does not vary but remains uniform, as then the operation of the filling-machine is more precise and the escape of the carbonic-acid gas from the beverage in the tank and in the filling-machine is avoided. By my invention the pressure of the beverage at the filling-machine is made up of the two components constituted by the height of the beverage column in the tank and the pressure exerted upon the surface of the beverage by the compressed air in the top of the tank, and the air pressure on the surface of the beverage may be increased to compensate for the decrease of the pressure of the head of the beverage as the height of the beverage falls during the filling-off into the bottles and so maintain a constant pressure of the beverage at the filling-machine. The air pressure on the surface of the beverage in the tank is shown by the pressure-gage 33 and may be increased by manipulating the pressure-supply valve 36 in correspondence with and to compensate for the decreased pressure caused by the falling level or loss of head of the beverage indicated by the liquid gage glass 5, which shows the top or level of the beverage in the tank and so its decreasing volume and rate of filling-off, and by observing these indications the operator may manipulate the valve 36 so that the evacuating pressure of the beverage at the filling-machine is constant. The gage glass 5 serves as a volumetric measure for the syrup and uncarbonated water in the tank according to the ounce-value of the syrup in the beverage and also as an index by which the operator may observe the loss of head of beverage and regulate the air pressure on the beverage in the tank during its filling-off to maintain a constant pressure of the beverage at the filling-machine. The cooling-jacket is desirable, for while pressure increases the absorption of the carbonic-acid gas by the beverage, the best results with reference to the amount of gas absorbed by the beverage are obtained when the pressure is limited and the temperature of the beverage is lowered, both during carbonation and filling-off into the bottles. A cooling jacket, preferably of the type equipped for circulation of a cooling medium, and having means to regulate its operation, as by the valve in the pipe 7, keeps the temperature of the beverage low so that the absorption and binding of the carbonic-acid gas by the beverage are increased at comparatively low pressure in the tank, and by making such a cooling-jacket part of the apparatus the mechanical equipment is simpler and superior and accomplishes better results.

I claim:—

1. In an apparatus for the manufacture of carbonated beverages, a tank having a liquid gage for indicating a given quantity of syrup and a combined quantity of syrup and uncarbonated water commensurate to the ounce-value of the syrup, means for simultaneously stirring the mixture and introducing gas therein, and means to control the air pressure in the tank to carbonate the mixture under a given pressure and to evacuate the beverage under increased pressure on its top compensating for the loss of head of the beverage indicated by said liquid gage.

2. In an apparatus for manufacturing carbonated beverages, a tank, a liquid gage to indicate changes in the level of the beverage in the tank, a beverage inlet and outlet pipe extending into the lower portion of said tank, a combined gas distributer and stirrer within said tank, means for rotating said stirrer, means for passing gas through said stirrer, and means to regulate the air pressure in the tank according to the level of the beverage indicated by said liquid gage to evacuate the beverage at constant pressure at the filling-machine.

3. In an apparatus for manufacturing carbonated beverages, a tank, a combined stirrer and gas distributer within said tank comprising a pair of rotatable hollow porous shells, means to convey gas to said shells, means to prevent back pressure through the shells, and means to rotate the shells.

4. In an apparatus for manufacturing carbonated beverages, a tank, a combined gas distributer and stirrer within said tank comprising a hollow shaft communicating with a source of gas-supply and a pair of hollow porous shells on the shaft and communicating with its bore, means to prevent back pressure through the shells, and means to rotate the shaft.

5. In an apparatus for manufacturing carbonated beverages, a tank, a combined stirrer and gas distributer within said tank comprising a shollow shaft communicating with a source of gas-supply and a pair of hollow porous shells on the shaft in the lower portion of the tank and communicating with the bore of the shaft, means to prevent back pressure through the shells, and means to rotate the shaft.

6. In an apparatus for manufacturing carbonated beverages, a tank, a combined gas distributer and stirrer comprising a hollow shaft extending into the tank, a pair of hollow porous shells on the shaft in the tank and communicating with the bore of the shaft, a non-return check-valve in the shaft, a bearing-block for the shaft having a passage communicating with the shaft-bore and with a source of gas-supply, and means to rotate the shaft.

7. In an apparatus for manufacturing carbonated beverages, a tank, a shaft extending into the tank and having a hollow bore and a pair of hollow arms communicating with the bore, a head having a reduced hollow end mounted in each arm, a hollow porous shell mounted on each head, means for passing gas to the shaft-bore, means to prevent back pressure through the shells, and means to rotate the shaft.

8. In an apparatus for manufacturing carbonated beverages, a tank, a combined stirrer and gas distributer within said tank comprising a pair of rotatable hollow porous shells, means to convey gas to said shells, means to prevent back pressure through the shells, means to rotate the shells, and a plate on the leading side of each shell.

9. In an apparatus for the manufacture of carbonated beverages, a tank having a gage glass for measuring off a given quantity of syrup and a combined quantity of syrup and uncarbonated water commensurate to the ounce-value of the syrup, means for carbonating the mixture including means for stirring the mixture during its carbonation, and means to maintain the pressure of the beverage at a substantially uniform rate during its filling-off from the tank indicated by said gage glass.

10. In an apparatus for manufacturing carbonated beverages, a tank having a beverage inlet and outlet, a gage glass for the tank to indicate a given quantity of syrup and a combined quantity of syrup and uncarbonated water in the tank commensurate to the ounce-value of the syrup and to indicate changes in the level of the beverage in the tank during its filling-off from the tank, means for stirring the beverage and introducing gas in the tank, and means to maintain constant pressure on the decreasing volume of beverage indicated by said gage glass during its filling-off.

In testimony whereof I affix my signature in presence of two witnesses.

HERMAN HEUSER.

Witnesses:
J. McROBERTS,
E. H. WILCOX.